Jan. 3, 1928.  1,654,568
C. C. WORTHINGTON
GANG LAWN MOWING MACHINE
Filed May 4, 1922  2 Sheets-Sheet 1
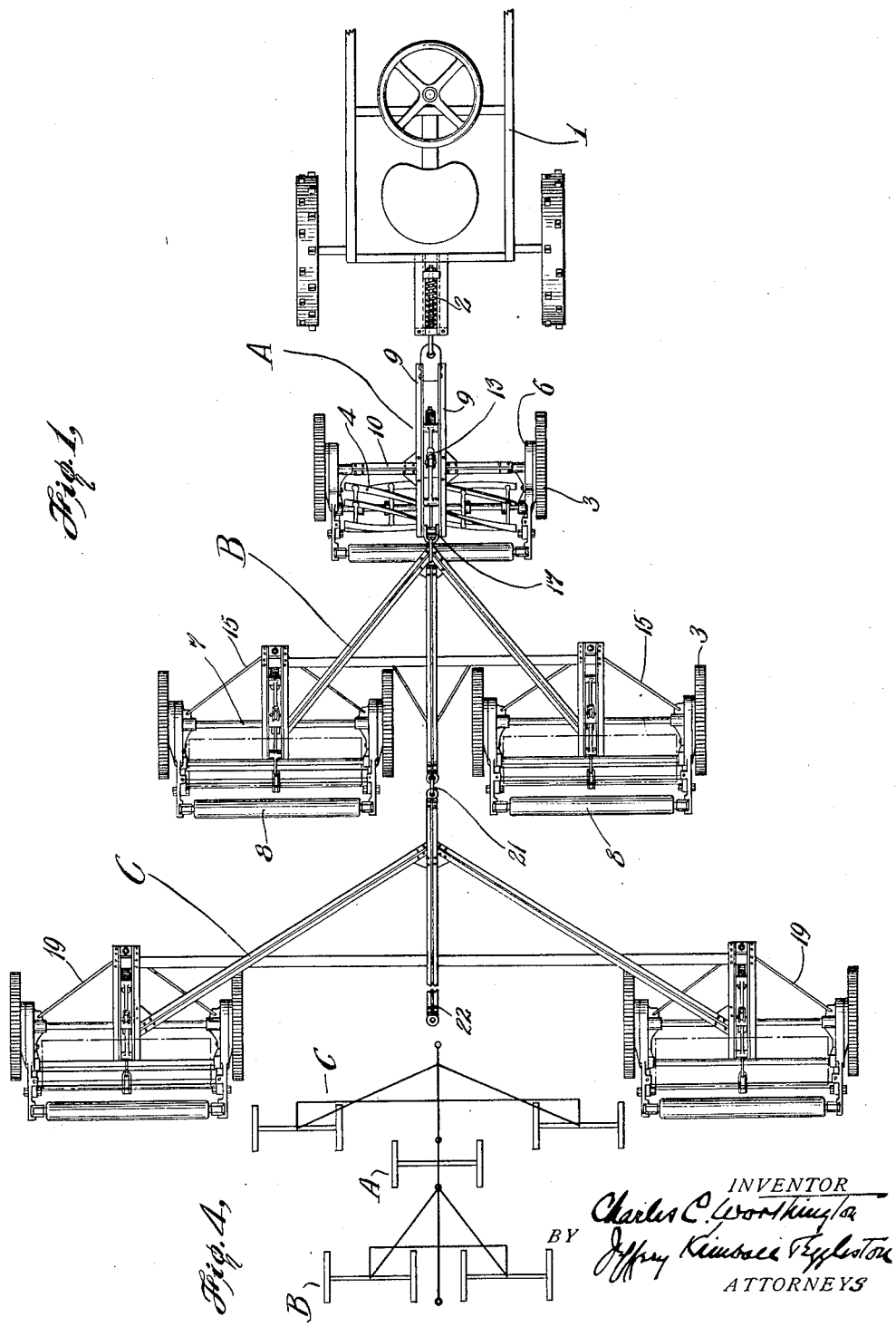

Jan. 3, 1928.  1,654,568
C. C. WORTHINGTON
GANG LAWN MOWING MACHINE
Filed May 4, 1922   2 Sheets-Sheet 2
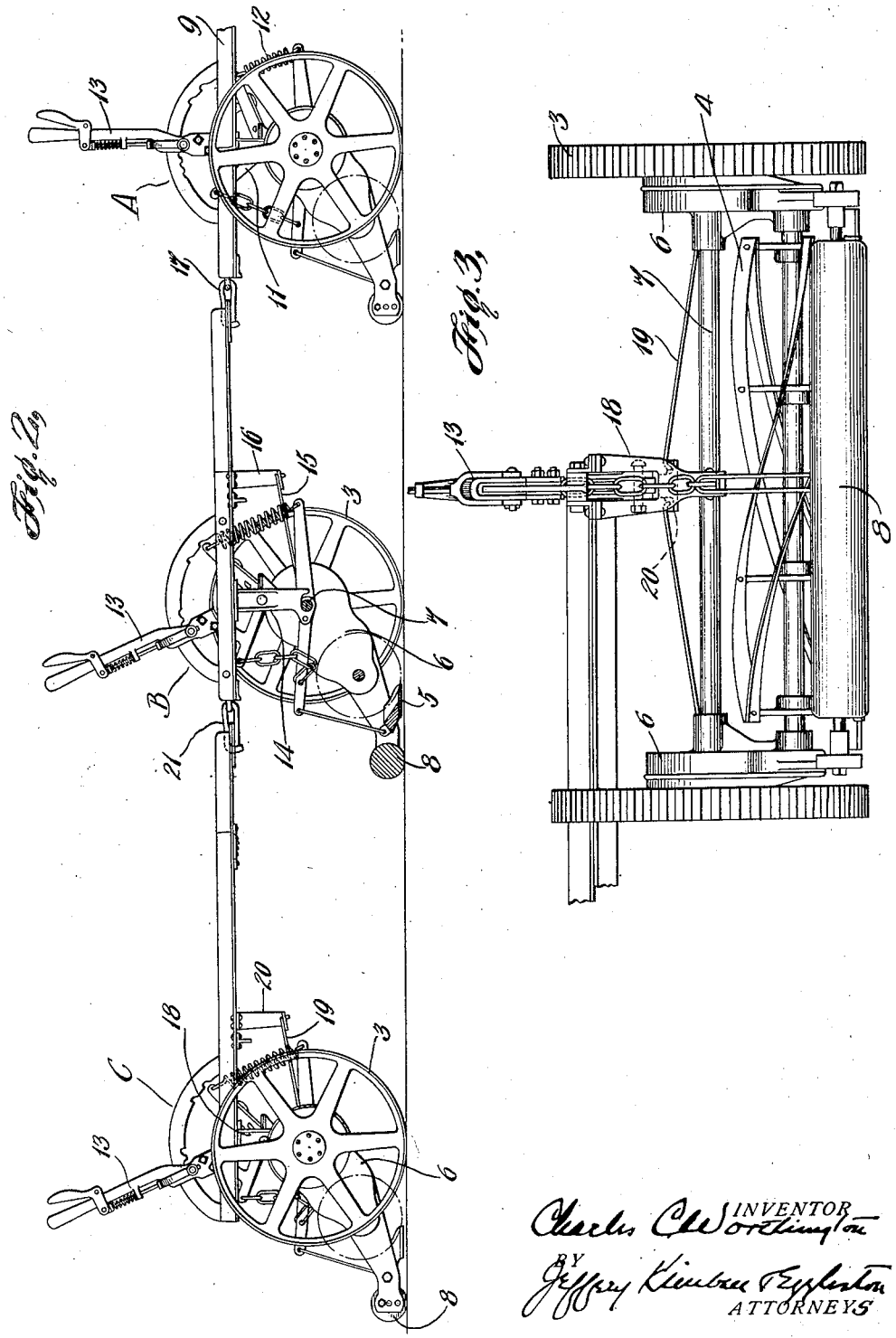

Patented Jan. 3, 1928.

1,654,568

UNITED STATES PATENT OFFICE.

CHARLES C. WORTHINGTON, OF DUNFIELD, NEW JERSEY.

GANG LAWN-MOWING MACHINE.

Application filed May 4, 1922. Serial No. 558,350.

This invention is an improvement in lawn mowing machines of the kind known as gang mowers, wherein several gang lawn mower units are held in spaced positions in transverse rows of one or more units so that their swaths overlap and so that the units are individually free to adapt themselves to the undulations of the ground. Gang lawn mowers in use prior to this invention comprise either three or five lawn mower units disposed in two transverse rows. The three unit gang has one unit in front and two in rear, or vice versa, and the five unit gang has three in front and two in rear, or vice versa. The swath of the five unit gang is about sixty-five per cent wider than that of the three unit gang, giving it the ability to do about sixty-five per cent more work in a given time. This superior efficiency makes the five unit machine more desirable than the three unit machine when the conditions are favorable for its greater width. In many places however the areas to be mowed are too contracted to admit of its safe use; in such localities the three unit machine is the safer and more flexible. This invention involves the provision of an appliance adapted to space and hold two lawn mower units in such positions that when connected to or assembled in a three unit machine, the swath of the latter will be increased or widened on each side, thus enlarging it to the width of a five unit swath. Such an appliance can be designed to be quickly assembled with the three unit gang in various ways, either behind, ahead of, or between the transverse rows of units thereof, or, if desired, in transverse registry or superposition with one of said rows, thereby making it possible to convert a three unit machine into a five unit machine, or vice versa, so that if the conditions are suitable the apparatus may be used as a five unit gang with its wider swath, or if the field to be mowed is obstructed the appliance may be removed and the apparatus used as a three unit gang with its narrower swath. In the preferred and simplest form of this invention the three unit gang is organized of two separable frame sections, one for each of its two transverse rows, the single unit being in front. In this form a still further reduction in the swath width can be accomplished by detaching the two unit frame section and using only the single unit. This preferred arrangement thus affords the advantage of three different swath widths to be had from a single equipment. However, and as will later appear, it is within this invention to organize the auxiliary frame section or appliance as a permanent part of a five unit machine without reference to its possible disconnection or the facility of reducing the swath width.

The principal draft members of all the frame sections are located below the tops of the ground wheels thus obviating any tendency to kick up at the rear and insuring the most effective draft relation throughout the entire gang. It will also be observed that the frame sections are arranged in a front to rear series and are successively universally articulated in the central longitudinal plane of the apparatus, the mower units being flexibly connected to said sections and symmetrically located with respect to the said plane, the arrangement permitting the frame sections to assume varying horizontal angles and to move in vertical planes to accommodate ground undulations, and the mower units to move relative to the frame sections to further accommodate ground inequalities.

In the accompanying drawings, the principle of the invention is illustrated as applied to a well known form of three unit machine to convert it into a five unit machine—

Figure 1 shows such a machine in plan view, the details of the units themselves being omitted or abbreviated because they are well known in the art;

Figure 2 is a side elevation of Figure 1;

Figure 3 a rear view of one end of the auxiliary frame section; and

Figure 4 a diagram of one of the various modified arrangements.

The lawn mowing machine is shown in Figure 1 as adapted to be drawn by a tractor 1 disposed in front of the front unit, but this will be understood to be merely the preferred arrangement. Such a tractor is connected to the gang through a lost motion draft connection in the form of a spring held draw bar 2, according to the principle explained in my Patent No. 1,618,502, Feb. 22, 1927, and for the purpose of avoiding injury to the turf by the cleats on the tractor wheels. All of the units may be assumed to be identical and each is constructed according to common design, having ground wheels 3, rotary cutters 4 driven by them, and bed knives 5 (Figure 2).

The frame of the unit comprises the gear-containing side plates 6, which are united front and rear by the cross rod 7 and bed knife 5 respectively and supported front and rear by the ground wheels 3 and rear roller 8 respectively.

The frame work constituting the means whereby the various units are held in proper overlapping arrangement is divided into a number of sections and one of said sections, herein referred to as the auxiliary section, is devoted exclusively to the spacing and control of the two outside units of the gang, therewith forming the appliance above referred to, while the other sections or section space and control the interior units, and with the latter constitute the three unit machine when the appliance section is removed. In the present case this three unit gang is composed of a front unit constituting the front row and two units constituting the rear or second row, these units being arranged and properly held in overlapping positions by their connected frame sections. The section for the first row or unit is designated generally by the letter A and consists of two longitudinal frame members 9, a cross member 10 and a pair of depending brackets 11 by which it is secured to the opposite ends of the cross rod 7 of the front unit. The connection of these brackets to the cross rod preferably allows the unit frame to swing or be lifted about the axis of the cross rod, which in the present case coincides with the axis of the ground wheels 3. This frame section is provided with a holding down spring 12 for resiliently pressing the cutter mechanism toward the ground and with a manual means such as the lever 13 and its associated parts for lifting the cutter mechanism from the ground to vary the height of the cut and for controlling the spring pressure. The principles and structural details involved in this mechanism form no part of the present invention, being disclosed in my Patent No. 1,607,378, Nov. 16, 1926, and also well known in the art. It will be observed however that the frame section A is maintained in an upright position principally by virtue of its connection to the draw bar of the tractor, being therefore a sulky type frame. Instead of being connected to a tractor it can of course be supplied with and supported by shafts for horse propulsion.

The frame section B which spaces and controls the two units next in rear may be constituted of any suitable assemblage of frame bars, such for example as that shown in the drawings and is supported at each end by a post 14 engaging and centrally resting on the cross rods 7 of each second row unit. This section is also connected to these units by two draft links 15 connected convergently from the sides of the unit frames to the depending posts 16. This form of connection between frame and units is also the same as disclosed in my co-pending application last above mentioned, and it will be seen that it holds the units of the second row in transverse alignment with each other, i. e. square to the direction of travel, while permitting them to tilt individually in the vertical planes of their wheel axes and permitting their cutter mechanisms to rise and fall, swinging about the same axis according to the undulations of the ground or the adjustment of the manual control means 13, which is the same as the means 13 above described. The section B is also a sulky type frame, being supported in its normal upright position by the separable shackle connection 17, which is its draft connection to the front section A. This flexible connection obviously permits the front and rear rows to assume different angles in horizontal planes, in vertical longitudinal planes, and in vertical transverse planes.

The frame sections A and B and their connected units constitute a three unit machine and represent the preferred type of such machine for use with this invention, although it will be understood that except as specially pointed out in the claims there is no limitation to this or any other type; that is to say, the principles of the present invention can be applied with advantage to any assemblage of any number of lawn mower units constituting a gang mower.

The auxiliary frame section C is constructed of any suitable assemblage of frame bars, such for example as that shown in the drawings and is quite the same as section B, except that it is wider. It constitutes the spacing and holding means for the two outside units of the complete equipment and is connected to said units in any suitable manner, the form of connection shown in the present case being identical with that between the units of the second row and their frame section; that is to say, it is provided with a post 18 at each end like the post 14 of section B and with draft links 19 like the links 15, connected to a post or bracket 20 so as to hold the units in transverse alignment with each other and with the same freedom for accommodation to ground undulations and with the same means 13 for manually controlling the action of the units. This section, it will be noted, holds its two units in transversely aligned positions suited for cutting the grass along the sides of the swath cut by the rest of the gang, said units being transversely spaced apart by a distance sufficient to adapt them to overlap the outer edges of the ends of their cutter reels nearer together than the width of the gang swath, so that when the appliance is assembled with the gang its units respectively overlap the cutter reels of the outermost units of the gang.

11. An appliance adapted to extend the swath of a three unit gang lawn mower of the rotary cutter reel type and comprising a frame section and two lawn mower units each having a cutter reel and held by said frame section in transverse alignment, with the far ends of their cutter reels farther apart and the near ends of their cutter reels nearer together than the width of the gang swath, so that when the appliance is connected to the gang its units respectively overlap the cutter reels of the outermost units of the gang.

12. In a gang lawn mowing apparatus of the rotary cutter reel type, a trailer frame section flexibly connected to only two mower units each having a cutter reel and held by said section in transverse alignment and separated by an intervening space sufficient to adapt their cutter reels to overlap the outer edges of the gang to which the trailer frame section is to be attached, said frame section having connecting means at its front and at its rear.

13. An appliance for gang mowers comprising a frame section adapted to be attached to a gang mower and having two lawn mower units, only, attached to it, one near each of its ends, by means permitting said units to accommodate ground undulations independent of each other, said units each having a cutter reel and being held by said frame section in positions transversely separated by an intervening space sufficient to adapt their cutter reels to overlap the outer edges of the swath of the outermost units so as to enlarge the swath of the gang mower to which they are attached.

14. A five unit lawn mower gang, each of whose units has a rotary cutter reel, having three frame sections connected respectively to one unit, to two units spaced apart less than a mower unit and to two units spaced apart sufficient to adapt their cutter reels to overlap the outer edges of the swath of the two unit group, each frame section being connected to its mower unit or units only and having in front and rear means for effecting removable connection.

15. A gang lawn mower composed of a plurality of cutter units arranged in three rows in overlapping position, one of said rows consisting of two units and one of said rows consisting of one unit.

16. A gang lawn mower composed of a plurality of cutter units arranged in three rows in overlapping position, one of said rows consisting of two units and one of said rows consisting of one unit, each of said rows being provided with draft means permitting it to assume independent horizontal angles with respect to the other rows in proceeding over the ground.

17. A gang lawn mower composed of a plurality of cutter units arranged in three rows in overlapping positions, two of said rows each having more than one cutter unit, draft means connecting said rows enabling the units of each row to individually accommodate ground undulations, and holding all units of a given row with their wheel axes always in the same vertical plane.

18. In a gang lawn mower a trailer gang composed of a plurality of rotary cutter units arranged in three rows in overlapping positions, draft means connecting said rows enabling the units of each row to individually accommodate ground undulations, draft means for each row, and a trailer frame for each row spacing said units, said trailer frames being held in operative position by the said draft means.

19. A gang mower consisting of five cutter units arranged in three overlapping rows, a main sectional frame for spacing and holding the said units in relative positions, horizontally flexible draft means whereby the said sections of the said frame may each assume varying horizontal angles to enable the said units when proceeding in a curve over the ground to cut an unbroken swath.

20. A gang mower consisting of five cutter units arranged in three overlapping rows, a main sectional frame for spacing and holding the said units in relative positions, horizontally flexible draft means whereby the said sections of the said frame may each assume varying horizontal angles to enable the said units when proceeding in a curve over the ground to cut an unbroken swath, and means whereby one or more of said rows may be detached from the said mower, without disturbing its continuity of swath.

21. In lawn mowing apparatus, the combination of five lawn mower units and means for uniting and spacing them in overlapping positions comprising frame sections arranged in a fore and aft series and being successively universally articulated whereby they may swing freely in a horizontal plane and are independently relatively movable in vertical planes, one of said frame sections being connected to the two outside units only and the other frame sections being connected to the other units, all the mower units being flexibly connected to said sections.

22. In lawn mowing apparatus, the combination of five lawn mower units arranged as a trailer gang and means for uniting and spacing them in overlapping positions comprising a rigid trailer frame section connected to the two outside mower units only, by means permitting said units to tilt in vertical planes to independently accommodate ground undulations and other frame gang swath. The two mower units are thus held by the frame section in spaced relation—as illustrated also in transverse alignment, i. e. square to the direction of travel of the section—and with the far ends of their cutter reels farther apart and the near ends of their cutter reels nearer together than the width of the gang swath. This frame section moreover is also a sulky type frame, being held in its normal upright position by its central draft connection 21 which is a shackle centrally connected to the section B the same as the draft connection 17 is connected to the section A and providing the same facilities for relative angular movement as will be apparent.

It is found in practice that the auxiliary section is the most conveniently used when connected in trailing relation to the three unit machine as shown in Fig. 1 because it can be readily dropped off or hooked on whenever circumstances require, but it is obvious that by reason of its rear extension 22 it can also be connected ahead of the three unit machine, as shown in Fig. 4, or between the rows thereof, whether the three unit machine comprises one unit in front and two in rear, as in the case illustrated, or has two units in front and one in rear. It will be observed also that by slight modification in its structural design, more particularly in the height of its posts 18, it can be connected in superposition with the section A and that various other changes may be made from the particular design illustrated both as to the structure of the frame work and the means whereby it is arranged to be drawn over the ground and whether it is mounted on the units themselves or on separate rolling members, all of such and other obvious departures from the illustrated form being intended to be included within the principles of this invention as defined by the appended claims.

I claim:—

1. In lawn mowing apparatus, the combination of five lawn mower units and means for uniting and spacing them in overlapping positions comprising a frame section connected to the two outside units only and other frame means connected to the other units.

2. In lawn mowing apparatus, the combination of five lawn mower units and means for uniting and spacing them in overlapping positions comprising a frame section connected to the two outside units only, other frame means connected to the other units and a flexible draft connection between said section and other frame means.

3. In lawn mowing apparatus, the combination of five lawn mower units and means for uniting and spacing them in overlapping positions comprising a frame section connected to the two outside units only and supported in part thereby and other frame means connected to the other units.

4. In lawn mowing apparatus, the combination of five lawn mower units arranged in a trailer gang and means for uniting and spacing them in overlapping positions comprising a rigid trailer frame section connected at its ends to the two outside units by means permitting said units to tilt in vertical planes to individually accommodate ground undulations and other frame means connected to the other units.

5. In lawn mowing apparatus, the combination of five lawn mower units and means for uniting and spacing them in overlapping positions in three transverse rows, comprising a frame section connected to two units of one row and two other frame sections respectively connected to the mower unit apparatus of the other rows.

6. A gang lawn mower comprising three transverse rows of lawn mower units, some of said rows having more than one unit, and three flexibly connected, sulky-type frame sections each connected to all of the units in its respective row.

7. A gang lawn mower comprising three rows of lawn mower units, some of said rows having more than one unit, three flexibly connected frame sections each connected to all of the units in its respective row and means on each frame section for supporting a cutter mechanism of the unit or units thereof in an elevated position above the ground.

8. An appliance for gang lawn mowers comprising a frame section, two lawn mower units each having a cutter reel and held by said frame section in transverse alignment and in positions transversely spaced apart by a distance sufficient to adapt their cutter reels to overlap the outer edges of the gang swath, and means for attaching said section to the gang lawn mower.

9. An appliance for gang lawn mowers comprising a frame section adapted to be attached to a gang mower and supported by its opposite ends upon a lawn mower unit by means permitting said units to accommodate ground undulations independently of each other, said units each having a cutter reel and being held by said frame section in positions transversely separated by an intervening space sufficient to adapt their cutter reels to overlap the outer edges of the swath of the outermost units and being thus adapted to enlarge the swath of the gang mower to which they are attached.

10. An appliance adapted to extend the swath of a three unit gang lawn mower of the rotary cutter reel type and comprising a frame section and two lawn mower units each having a cutter reel and held by said frame section in spaced relation, with the far ends of their cutter reels farther apart and the near sections connected to the other units by like means.

23. A lawn mowing apparatus comprising five lawn mower units and means for uniting and spacing them in overlapping positions comprising a frame section connected to the outside units and other frame sections connected to the other units, said frame sections being arranged in a fore and aft series and being successively universally articulated in the central longitudinal plane of the apparatus, whereby they may swing freely in a horizontal plane and are independently relatively movable in vertical planes, the mower units being flexibly connected to said sections and symmetrically related to the longitudinal axis of the apparatus.

24. A lawn mowing apparatus comprising five lawn mower units and means for uniting and spacing them in overlapping positions in three transverse rows, said means comprising a trailer frame section connected to two units of one row and two other trailer frame sections respectively connected to the mower unit apparatus of the other rows, each such trailer frame section being horizontally flexibly connected to one of the other trailer frame sections for free swinging in a horizontal plane, the flexible connection of each trailer frame section to one of the other trailer frame sections being in the central longitudinal plane of the apparatus and the mower units being flexibly connected to said sections and symmetrically related to the longitudinal axis of the apparatus.

25. A lawn mowing apparatus comprising five lawn mower units having ground wheels and a trailer gang frame for uniting and spacing them comprising a fore and aft series of three frame sections each located below the tops of the mower unit ground wheels and successively universally articulated in the central longitudinal plane of the apparatus.

26. A lawn mowing apparatus comprising five lawn mower units and means for uniting and spacing them in overlapping positions in three transverse rows comprising a trailer frame section connected to two units of one row and two other trailer frame sections, each respectively connected to the mower unit apparatus of its respective row, each such trailer frame section being flexibly connected to one of the other trailer frame sections for free swinging in a horizontal plane, the principal draft members of all the frame sections being located below the tops of the ground wheels.

27. A lawn mowing apparatus comprising five lawn mower units and a plurality of frame sections connected in a trailer gang and to which the mower units are connected, one of the frame sections being connected to the two outside mower units only and being provided with means enabling it to be removably connected in the trailer gang so as to adapt it to be differently placed therein.

28. A lawn mowing apparatus comprising five lawn mowing units, and a plurality of frame sections connected in a trailer gang and to which the mower units are connected, one of the frame sections being connected to the two outside mower units only, and each of said frame sections having means for removably connecting it in the trailer gang so as to permit relative rearrangement of the several frame sections in the gang.

29. A lawn mowing apparatus comprising a trailer gang frame having a fore and aft series of sections successively articulated in the central longitudinal plane of the apparatus, and mower units each having a cutter reel and flexibly connected to said sections and symmetrically related to said plane, mower units of different rows overlapping, and the two outer mower units being separated transversely by an intervening space sufficient to adapt their cutter reels to overlap the outer edges of the swath of the outermost units of the rest of the gang and being flexibly connected to the respective ends of one of said sections with the vertical planes of their axes at right angles to the central longitudinal plane of the mower.

In testimony whereof, I have signed this specification.

CHARLES C. WORTHINGTON.